Feb. 9, 1954

W. H. SILVER ET AL 2,668,489

TRACTOR-MOUNTED LISTER

Filed Dec. 29, 1949

INVENTORS
WALTER H. SILVER
WILLIAM V. LOHRMAN
BY
ATTORNEYS

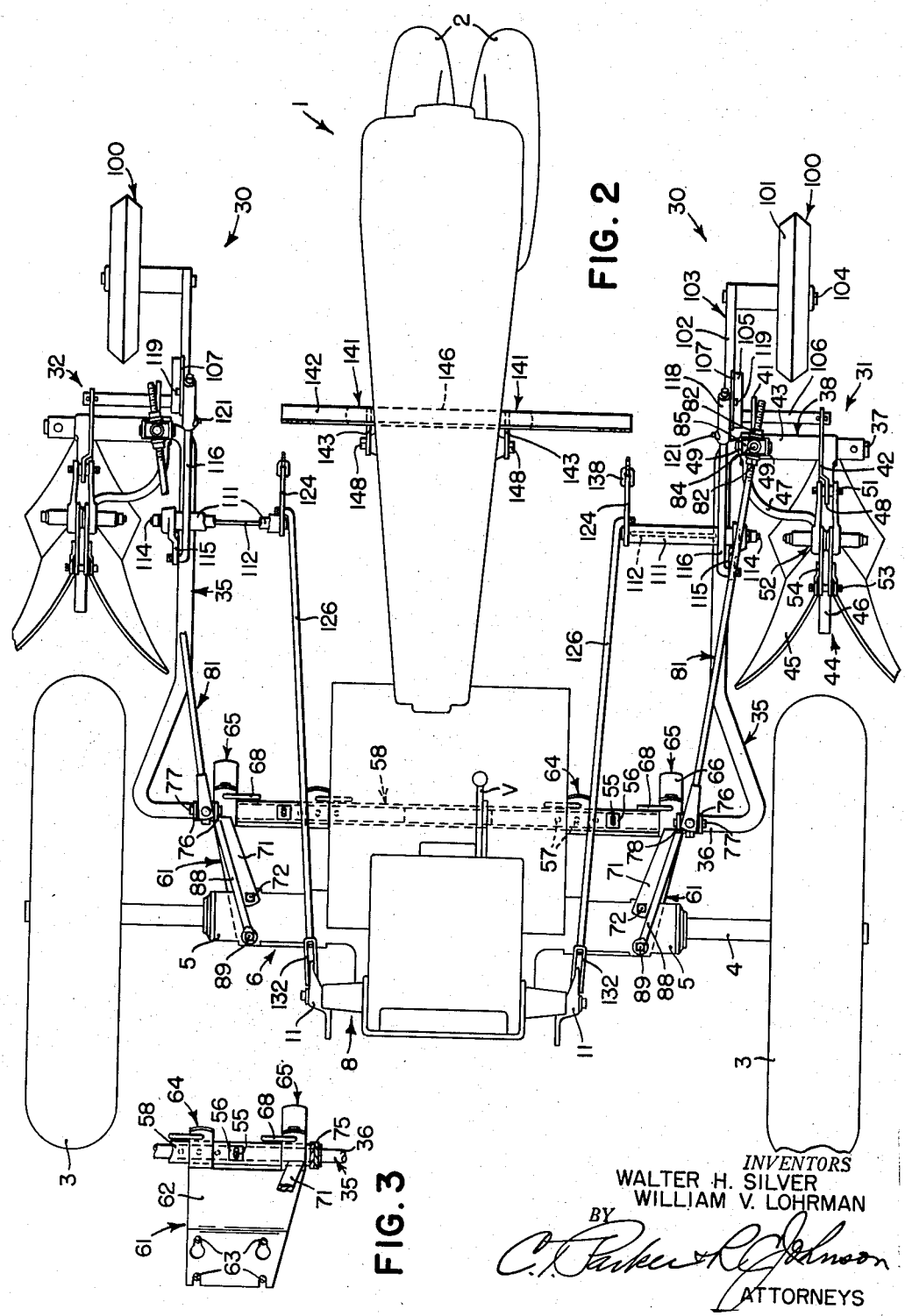

Patented Feb. 9, 1954

2,668,489

UNITED STATES PATENT OFFICE 2,668,489

TRACTOR-MOUNTED LISTER

Walter H. Silver, Moline, Ill., and William V. Lohrman, Davenport, Iowa, assignors to Deere & Company, Moline, Ill., a corporation of Illinois Application December 29, 1949, Serial No. 135,642

3 Claims. (Cl. 97—47.12)

The present invention relates generally to agricultural implements and more particularly to tractor-mounted, ground-working implements, such as listers, bedders and the like.

The object and general nature of the present invention is the provision of a new and improved lister or bedder of the tractor-mounted or integral type especially constructed and arranged for quick attachment to or disconnection from its supporting tractor. More particularly, it is a feature of this invention to provide a lister or bedder having new and improved means for controlling the depth of operation of the lister or bedder bottoms, and still further, it is a feature of this invention to provide raising and lowering mechanism operative through one range for adjusting the depth of operation of the tools or bottoms and operative through another range to raise the tools or bottoms into a raised or transport position.

These and other objects and advantages of the present invention will be apparent to those skilled in the art after a consideration of the following detailed description, taken in conjunction with the accompanying drawings, in which:

Figure 2 is a plan view of the implement shown in Figure 1.

Figure 3 is a fragmentary plan view of a portion of the structure by which the implement is connected to a propelling tractor.

Figure 1:
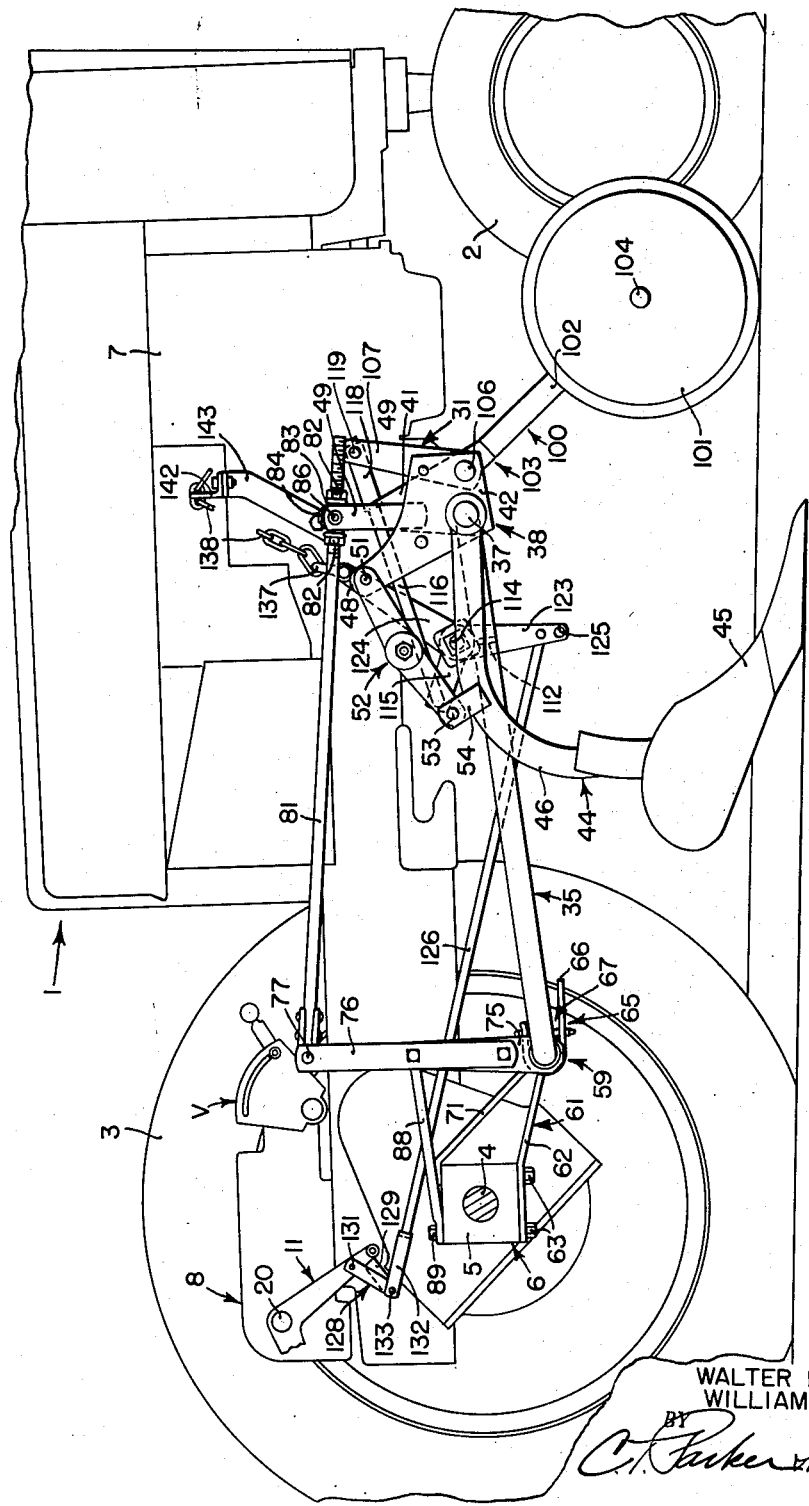
Figure 1 is a side view of a tractor-mounted lister or bedder in which the principles of the present invention have been incorporated.

Referring now more particularly to Figures 1 and 2, the tractor is indicated in its entirety by the reference numeral 1 and includes a pair of closely spaced front wheels 2 and a pair of wide spaced rear traction wheels 3 mounted on axle shafts 4 that are carried in extensions 5 forming a part of the rear axle structure 6 of the tractor. The tractor includes a power plant 7 and a power lift unit 8 of the hydraulic type, including suitable valve mechanism V and other necessary parts, such as a pair of lift arms 11 which are clamped or otherwise fixed in any suitable manner to the ends of a power lift rockshaft 20 which forms a part of the hydraulic unit 8. The arms 11 provide means whereby a power operating connection may be made with agricultural implements of various kinds, such as for example, a lister or bedder.

The lister or bedder implement, with which the present invention is more particularly concerned, is indicated in its entirety by the reference numeral 30 and comprises right- and left-hand implement units 31 and 32. Since for all practical purposes these implement units 31 and 32 are identical, except that certain parts may be right-hand or left-hand, as the case may be, a detailed description of the right-hand unit 31 will suffice for a full and complete understanding of the implement units.

As best shown in Figures 1 and 2 the right-hand implement unit includes a right-hand push bar 35, the rear end 36 of which is bent so as to extend laterally inwardly while the forward end of the bar 35 is bent so as to extend laterally outwardly, as shown at 37. A bracket structure 38 is pivotally connected with or mounted on the outturned end 37 of the push bar 35 and includes a pair of laterally spaced-apart bracket plates 41 and 42 secured, as by welding, to a sleeve member 43 which receives and is rockably mounted on the outturned push bar end 37. A ground-working tool 44, such as a lister plow having a lister plow bottom 45, is swingably connected with the forward end 37 of the push bar 35 and includes a main plow beam 46 and a laterally inwardly extending brace beam 47 secured rigidly at its rear end to the beam 46, the beams 46 and 47 being apertured at their forward ends to receive the laterally outturned push bar portion 37 with the bracket sleeve member 43 disposed therebetween. The laterally spaced bracket plates 41 and 42 are extended upwardly by any suitable means, such as an integral extension 48 in the case of the bracket plate 42 and a pair of hammer strap members 49 in the case of the bracket plate 41. The bracket plate extension 48 is apertured to receive a pivot 51 by which an overload release unit 52 is pivotally connected with the bracket 42, the rear end of the unit 52 being connected by a pivot 53 to a pair of lugs 54 secured, as by welding, to the main plow beam 46. The overload release unit 52 is similar to or substantially the same as the overload release unit shown in U. S. Patent No. 2,337,026, issued December 21, 1943, to John I. Cantral, to which reference may be made if necessary. As long as the release unit 52 is in its normal operating position, as shown in Figure 1, the furrow opener unit 44 is connected rigidly with the bracket structure 38.

The laterally inturned end portions 36 at the rear of the implement are received for independent movement within a transverse tubular member 58 which forms a part of the attaching structure, indicated in its entirety by the reference numeral 59. The inturned end portions 36 of the push bars are held against lateral displacement in the tubular member 58 by pins 55 extending through slots 56 in the tubular member 58 and selected apertures 57 in the push bar ends 36. The attaching structure 59 includes, in addition to the tubular member 58, a pair of right- and left-hand supports or brackets 61, each of which includes a lower plate 62 adapted to be connected, as by attaching studs 63 (Figure 1), to the lower side of the associated rear axle extension 5. Connected to the forward edge portion of each of the plates 62 is a pair of U-shaped members 64 and 65, each member 65 having a lowermost lip or extension 66 and both members 64 and 65 providing forwardly facing sockets 67 in which the associated end portion of the attaching tubular member 58 is disposed. The upper and lower portions of each of the socket members 64 and 65 are apertured to receive quick detachable locking pins 68 which serve to hold the member 58 in position in the sockets 67. Each supporting plate 62 is reenforced by an outer diagonally disposed strap member 71 which is welded at its lower end to the U-shaped socket member 65 and at its upper end is adapted to receive a stud 72 which connects the brace member 71 rigidly to the associated tractor axle extension 5.

Each of the outer end portions of the tubular member 58 has a pair of upwardly extending bars 75 secured thereto, as by welding, the lower ends of the bars 75 being apertured to permit their being passed onto the associated end of the tubular member 58. Fixed to the upwardly extending bars 75 is a pair of hammer straps 76 which at their upper ends are apertured to receive the trunnions 77 of a block member 78 to which the rear end of a stabilizing link 81 is pivotally connected for lateral swinging movement. The forward end of the link 81 is threaded to receive a pair of lock nuts 82 disposed on opposite sides of a sleeve member 83 which is mounted by trunnions 84 for lateral movement relative to a connecting yoke member 85 which is swiveled by trunnions 86 in the upper ends of the bracket extension strap 49. The supporting bracket members 75, 76 are held rigidly in upright relation relative to the tractor by a strut 88 which is connected at its forward end to the bars 75 by the upper bolts which connect the straps 76 to the bars 75. At its rear end each of the struts 88 is connected rigidly to the tractor by a stud 89 which is threaded into one of the vertically extending apertures in the associated rear axle extension 5.

By virtue of the structure so far described, each of the lister or bedder bottoms 45 is connected rigidly to a supporting bracket structure 38 which is connected with the rear axle of the propelling tractor by means of rearwardly diverging, generally vertically spaced links 35 and 81 which, converging forwardly, provide a virtual hitch point for the tool 45 which is located well ahead of the tractor. The overload release units 52 protect the tools 45 when they strike an obstruction or the like.

Each of the furrow openers or ground-working tools 45 is capable of moving vertically relative to the tractor and independently of one another, and each of the tools 45 is controlled by a gauge wheel unit 100.

Each of the gauge wheel units 100 includes a ground-engaging gauge wheel 101 mounted on an arm 102 which constitutes a part of a gauge-wheel-receiving axle construction 103. In addition to the arm 102, each gauge wheel axle construction includes a laterally extending axle shaft 104 fixed to the lower end of the arm 102, a bar 105 and an axle shaft 106 disposed for rocking movement in apertures formed in the supporting bracket plates 41 and 42 and to which the arm 105 is rigidly connected as by welding. The gauge wheel unit 103 also includes an upwardly extending arm 107 which is fixed at its lower end to the shaft 106 generally alongside the arm 105. To vary the lateral spacing of the gauge wheel 101 relative to the associated tool, the arm 102 may be connected to the arm 105 on either the inner side or the outer side thereof.

According to the provisions of the present invention, the adjusting of the gauge wheels 101 relative to the associated furrow openers 45 and the raising and lowering of the implement units 31 and 32 relative to the tractor are effected by suitable connections to the power lift arms 11. To this end, a sleeve member 111 is securely welded at its laterally outer end portion to each of the push bars 35, generally adjacent the forward portion thereof, and each sleeve member 111 is reenforced by a bracing plate 112 which is welded along its upper edge to the lower portions of the associated sleeve 111 and at its laterally outer end to the adjacent portions of the associated push bar 35. A transversely disposed shaft 114 is disposed for rocking movement within each of the sleeves 111. Secured to the outer end of each of the shafts 114 is an arm 115 that is connected by a link 116 to the associated gauge wheel controlling arm 107; the connection between the forward end of the link 116 and the arm 107 being effected by a sleeve member 118 having a stud 119 pivotally disposed in an aperture in the upper end of the arm 107, with a set screw 121 fixing the position of the sleeve member 118 relative to the link 116. Secured to the inner end of each rock-shaft 114 is a pair of arms 123 and 124. The arm 123 is apertured at one or more points as at 125, to receive the forward end of a controlling link 126, the rear end of which is connected by a swinging link 128 to the associated power lift arm 11. Each of the swinging links 128 includes an abutment section 129 which engages the outer end portion of the associated power lift arm 11, whereby relative movement between the link 128 and the arm 11 in a forward or outward direction is prevented. The swinging link 128 is pivotally connected to the arm 11 by a suitable pivot means 131, and the connection between the rear end of the link 126 and the associated swinging link 128 is effected by means of a bifurcated portion 132 and a quick detachable pivot pin 133. The other arm 124, carried at the laterally inner end of each shaft 114, is apertured to receive a swivel 137 which forms a part of a normally slack chain connection 138 which extends from the arm 124 to the tractor body. To receive the upper ends of the normally slack chains 138, a laterally outwardly extending bracket 141 is fixed to each side of the tractor. Each bracket 141 includes a laterally outwardly extending angle member 142, the vertical flange of which is slotted at a plurality of points to releasably receive selected links of the associated chains 138. Each angle member 142 is reenforced by bracing structure 143; and the laterally inner ends of the angle members 142 are tied together by a strap member 146. The angle members 142 and/or the bracing structures 143 are securely bolted to suitable points on the tractor body, for example, to the side portions of the clutch housing by attaching bolts 148.

The operation of the implement described above is substantially as follows.

The parts are illustrated in Figure 1 in their normal working position in which, it will be noted, the position of the gauge wheel 101 relative to the furrow opener 45 is controlled by the position of the tractor power lift arm 11. The tractor power lift 8 is preferably of such construction that the arms 11 may be disposed in any one of several selected positions or may be swung downwardly and rearwardly, as shown in Figure 1, to lift the tools as well as the gauge wheels out of engagement with the ground and into a position for transport. Also, the power lift structure is of such construction that counterclockwise movement of the shaft 20 and arms 11 (Figure 1) is prevented but clockwise movement of the arms 11 may take place.

Looking at Figure 1, any tendency for the furrow opener 45 to run too deep is prevented by means of the gauge wheel 101, although both may move vertically relative to the tractor by virtue of vertical swinging movements of the members 35 and 81. The gauge wheel 101 limits the downward movement of the furrow opener 45 since the power lift structure, including the arms 11, cooperating with the stops 129 on the swinging links 128, effectively prevent any forward movement of the links 126, and the latter, in turn, prevent any clockwise movement of the arms 115 and 123 and the associated shaft 114, which, in turn, acts through the associated link 116 to prevent any clockwise movement of the gauge wheel arms 102, 105 and 107. Thus, as the tractor approaches and passes over a rise in the ground surface, the gauge wheel 101 moves upwardly and, in doing so, lifts the associated tool 45 so as to maintain a substantially constant depth of operation. However, if, for example, the gauge wheel 101 should encounter and momentarily enter a depression in the ground, the wheel 101 is free to move downwardly without causing or tending to cause the associated tool 45 to increase its depth of operation since relatively free downward movement of the gauge wheel 101 is momentarily accommodated since the associated link 126 may move freely rearwardly relative to the power lift arm 11 by virtue of the swinging link 128 and its ability to swing rearwardly relative to the arm 11. Thus, the links 126 are permitted to shift freely rearwardly even through the power lift arm 11 may be on a dead-center relationship, or the links 126 and 128 connected to a power lift structure in which the power lift arms are held against movement in either direction in operation position.

When the parts are arranged as shown in Figure 1, the power lift arms 11 may be operated so as to raise and lower the gauge wheels 101 relative to the associated lister bottoms for controlling or varying the depth of operation of the latter.

In order to raise the tools and the gauge wheels relative to the tractor for purposes of transport and the like, the power lift valve V is operated so as to cause the arms 11 to swing clockwise (Fig. 1) through their full extent. This exerts a rearwardly directed pull through the links 126 against the arms 123 which, in turn, causes the shafts 114 and arms 115 to be rotated in a clockwise direction (Figure 1) swinging the lift arms 124 downwardly relative to the push bars 35 and associated tools and gauge wheels. After the normally existing slack in the chains 138, which is necessary to provide for controlling the gauge wheels 101 by the tractor power lift to effect depth adjustments, is taken up, further downward movement of the arms 124 relative to the hitch bars 35 acts against the tractor-carried brackets 141 and results in raising the front ends of the push bars into a position for transport. Since the hitch bars 35 and upper links 81 are connected with the suppotring brackets 75, 76, at points spaced apart farther than the distance between the front ends of the push bars 35 and links 81, the points of the furrow openers are moved rearwardly and upwardly while the gauge wheels 101 are moved generally rearwardly and downwardly, relative to the upwardly movable push bars 35. This results in a relative lowering of the gauge wheels 101 into positions relative to the furrow openers 45 such that the gauge wheels serve to prevent the points of the furrow openers from striking obstructions, gathering trash or the like, when transporting the outfit from one field to another.

The implement of the present invention may readily be disconnected from the tractor merely by removing the quick detachable pins 68, disconnecting the chains 138 from the slots 143 and loosening the bolts connecting the forward ends of each of the struts 88 to the bracket members 75 and removing the attaching studs 89, thus freeing the struts 88 from the tractor axle. Then by backing the tractor slightly the transverse attaching tubular member 58 will slide out of the sockets 67 and drop to the ground. Continuing the backing of the tractor away from the implement, the front wheels pass readily over the tubular member 58, thus releasing the tractor for other uses. Similarly, the implement may readily be reattached to the tractor simply by driving the same into position relative to the implement, then litfing the attaching tubular member 58 and placing it on the lower socket member extensions 66, and then driving the tractor forward slightly, after which the attaching pins 68 may be inserted and the other connections with the various parts of the implements reestablished.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. For use in an agricultural implement of the type adapted to be mounted on a tractor having a narrow body and a rear axle including laterally outwardly disposed extensions, and in which said implement includes a pair of push bars adapted to be disposed at opposite sides of the tractor body and including laterally inturned portions at the rear ends of the push bars, the improvement comprising an attaching structure including a pair of supports attachable to said tractor axle extensions and each including means providing a pair of laterally spaced apart, forwardly facing sockets, a transverse tubular member releasably disposed in said sockets and adapted to rockably receive the inturned end portions of said push bars and to be seated in said sockets, an upstanding arm fixed at its lower end to each end of said tubular member, brace means connectible between each upstanding arm and the tractor rear axle, and means carried by each of said sockets and disposable in front of the associated tubular member for releasably holding said tubular member in said sockets.

2. For use in an agricultural implement of the type adapted to be mounted on a tractor having a narrow body and a rear axle including laterally outwardly disposed extensions, and in which said implement includes a pair of push bars adapted to be disposed at opposite sides of the tractor body and including laterally inturned portions at the rear ends of the push bars, bracket means pivoted to the front ends of said push bars, ground working tool means connected to said bracket means, and stabilizing links disposed above said push bars and extending rearwardly from said bracket means, the improvement comprising an attaching structure including a pair of supports attachable to said tractor axle extensions and including means providing forwardly facing sockets, a transverse tubular member adapted to rockably receive the inturned end portions of said push bars and to be seated in said sockets, means carried by said sockets and engageable with the forward portions of said tubular member for holding the latter in said sockets, upwardly extending parts fixed at their lower ends to the end portions of said tubular member, means connectible between each upstanding part and the tractor rear axle for holding said tubular member against rotation in said sockets, means for pivotally connecting the rear ends of said links to the upper end portions of said parts, and means carried by said tubular member and engageable, respectively, with laterally spaced apart portions of said push bars for detachably holding said inturned push bar end portions in different lateral positions in the ends of said tubular member.

3. The invention set forth in claim 2, further characterized by raising means adapted to be mounted on each of said push bars, a transverse part adapted to be mounted on the tractor in a position above said raising means, and means engageable with said transverse part at different laterally spaced apart points for connecting each raising means with the associated end of said transverse part in different lateral positions corresponding to the different lateral positions at which the rear ends of said push bars may be connected with the end portions of said tubular member.

WALTER H. SILVER.
WILLIAM V. LOHRMAN.

References Cited in the file of this patent
UNITED STATES PATENTS

| Number | Name | Date |
|---|---|---|
| 2,046,466 | Kolterman | July 7, 1936 |
| 2,249,807 | Brown | July 22, 1941 |
| 2,354,886 | Silver | Aug. 1, 1944 |
| 2,423,148 | Johnson | July 1, 1947 |
| 2,424,372 | Silver | July 22, 1947 |
| 2,485,651 | Oerman | Oct. 25, 1949 |